April 30, 1968  H. W. ARNOLD ET AL  3,380,269
AUTOMATIC TERMINATION
Filed Oct. 23, 1965  2 Sheets-Sheet 1
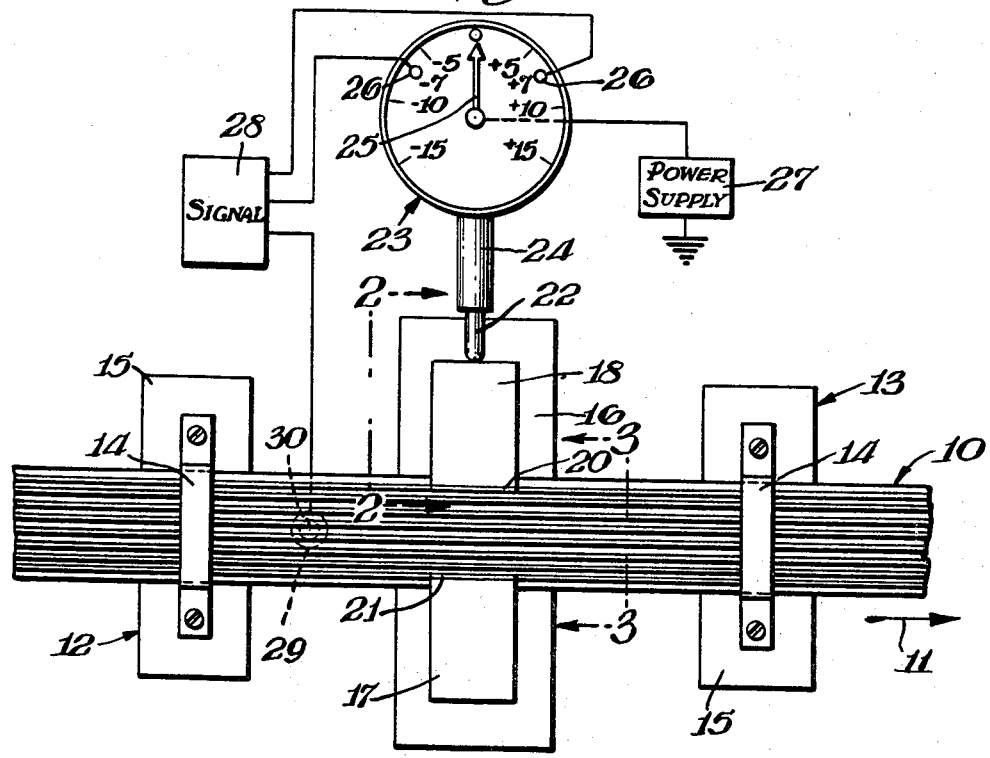
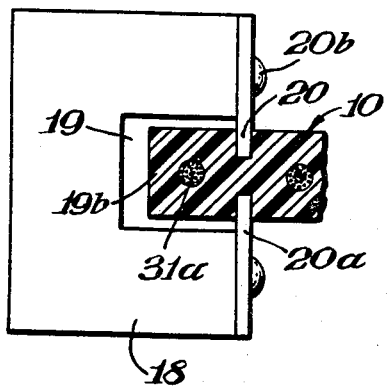
INVENTORS
Howard W. Arnold
Fred S. Eldreth
Wilbert L. Gore
BY C. W. Mortenson
ATTORNEY INVENTORS
Howard W. Arnold
Fred S. Eldreth
Wilbert L. Gore
BY
ATTORNEY & # United States Patent Office 3,380,269
Patented Apr. 30, 1968

3,380,269
AUTOMATIC TERMINATION
Howard W. Arnold, Fred S. Eldreth, and Wilbert L. Gore, Newark, Del., assignors to W. L. Gore & Associates, Inc., Newark, Del., a corporation of Delaware
Filed Oct. 23, 1965, Ser. No. 503,327
16 Claims. (Cl. 72—4)

ABSTRACT OF THE DISCLOSURE

A tool is provided for working on a work-piece, such as a ribbon cable, positioned in the tool, the tool having reciprocating elements that act in a plane substantially perpendicular to said work-piece to effect cutting, bending and the like of said piece which can be passed through a testing device on its way to said tool. The testing device comprises supports and at least one guiding element; a means to measure distance deviations in said cable is employed for control purposes.

---

This invention relates to the treating of conductor ribbon cables as, for example, trimming widths and stripping to form terminals. More particularly, it relates to devices for precisely trimming a grooved ribbon cable to a constant width and for terminating the cable at the exact length desired and exposing or unsheathing or otherwise treating given conductors as desired.

Ribbon cables are being used in increasing quantities in applications where weight and volume reductions are important. They are prepared using round, flat strip or flat stranded conductors, and the conductors are coated with an insulation material such as poly(tetrafluoroethylene) and other fluorocarbon polymers, polyesters, polyester/polyethylene laminates, polyamides and polyurethane. In the cable the individual conductors run side-by-side longitudinally. They are placed in this relationship by passing the plurality of conductors between two surfaces, sheets or similar continuous bodies of the insulating polymer to and through the nip of two pressure rolls. The rolls are grooved and as each wire and the insulation around it passes through its given groove the insulation material adjacent to the wire is pressed together by ridges in the rolls adjacent to the grooves. A connecting web is produced, and the conductors emerge from the exit side of the rolls as a unit cable. Processes and products of this kind are described in the Robert W. Gore Patent U.S. 3,082,292 with particular reference to cables in which tetrafluoroethylene polymers are used as the insulating material. While the products and processes of the patent are outstanding, the ever-increasing demand for space and weight reductions coupled with precise control has made a precise positioning of the conductors in the cable a desirable attainment. This means, among other factors, that the width of the cable must be uniform all along its length and that the length must be fixed precisely. Further, at the ends, the conductors must be unsheathed without damage to the conductor section that is to be exposed or to the remaining insulation. Also, if certain conductors are to be bent or placed in a given position or angle to other conductors, this must be done precisely. In many applications, as, for example, in the missile field, a defect can not be tolerated because it might lead to the failure that takes lives or that results in very large losses in time and in money. Therefore, it is highly desirable to provide means for controlling precisely the dimensions of a given cable both in its sheathed areas and in areas where conductors are exposed.

Accordingly, an objective of this invention is the provision of apparatus and methods for precisely measuring the width of a cable. Another aim is the provision of means for marking the cable at the area in which a variation occurs. A further purpose is making available an apparatus for terminating the cable at a precise length. A still further purpose is treating the cable at its terminal in a precise fashion to unsheath or otherwise work on a given conductor without damaging it. These and other objectives will appear hereinafter.

The aims of this invention are accomplished by the provision of a gauge which measures the spacing across a ribbon, grooved cable—that is, the distance between the outside grooves. As the grooved cable is being moved it is passed through a device which holds a tongue in each of the two outside grooves. One of the tongues is fixed in its position to ride in and hold one edge of the cable. The other tongue riding in the outermost groove at the opposite edge of the cable is positioned on a slidable member which may move either toward or away from the fixed tongue. If the distance between the two grooves is constant, the slidable element does not move but if the distance varies it will move. As it moves, it contacts a dial indicator gauge which reads directly in mils the distance of movement. The indicator gauge has electrical contacts at specified limit points, and when those points are reached, a bell rings and a mark is placed on the cable at or near the point where the width across the cable has exceeded the said maximum or minimum spacing on the gauge.

In conjunction with this gauge, either as a built-in conponent or, preferably, as a separate component, there is provided by this invention a device for terminating and working on the exposed terminal conductors. This device is equipped with tongues which also ride in the grooves and it is equipped with blades or other tools. Thus, one can by activating the blades cut the insulation without cutting the conductor, and he can thus readily strip off the insulation at the given end of the cable. The tool that he uses can be something other than a cutter as, for example, gauges and benders. However, for convenience the description below will be made chiefly in reference to the cutting blades.

This invention will be further understood by the description and the drawings which are given only for illustrative purposes and are not limitative.

In the drawings:

FIGURE 1 is a plan view showing the ribbon cable in position for measurement for width;

FIGURE 2 is taken on line 2—2 of FIGURE 1;

FIGURE 3 is taken on line 3—3 of FIGURE 1;

Figure 4:
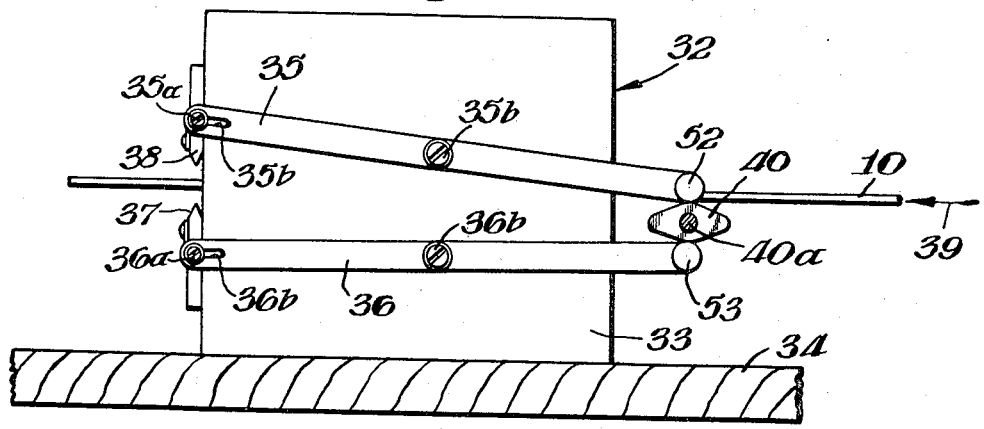
FIGURE 4 is a side elevation of a cutter or stripper of this invention.

Referring to FIGURE 1, the cable 10 is shown passing in the direction of arrow 11 through a guide 12 and a guide 13. These guides may simply be raised brackets 14 positioned on the table or supports 15. Intermediate of these guides is a plate or table 16 which supports fixed, tongue-bearing block 17 and movable, tongue-bearing block 18. Referring to FIGURE 2, it will be seen that the tongue-bearing block 18 has a notched-out portion 19 which accommodates a part of the cable 10. There is also a downwardly extending tongue 20 which fits into the outermost groove of cable 10. Preferably, there is also present an upwardly extending tongue 20a that co-acts with tongue 20. A tongue can be fixed to block 18 by screw 20b through a hole or slot not shown for convenience.

It will be appreciated that tongue-bearing block 17 is similarly located directly opposite block 18 and that it has similar tongues similarly positioned in the last groove of the cable 10 on that side of the cable. As cable 10 moves in direction shown by arrow 11, it is held in position by the gripping of the tongues 21 and 21b (FIG. 3) in block 17 which tongues are riding in respective grooves and hold the ribbon in place during its travel. Therefore, that moving edge is fixed in position. Further, it will be appreciated that the cable has been previously passed through a trimmer or slitter, not shown, which has trimmed off any rough edges along the sides 10a and 10b of the cable, thus making those edges cleanly cut and the end sections 19b of cable 10 contained in space 19 comparable to each other.

However, the distance across the cable from tongues 20, 20a to tongues 21, 21a may vary, and this variance must be known for several reasons. There are good electrical reasons for having the cable uniformly separated with the same amount of insulation between conductors, for the electrical effects in such a uniform placement will be uniform throughout the length of a given cable. There are also mechanical reasons for desiring uniformity, as, for example, in working on conductors during installation of terminals. A conductor that is misplaced may inadvertently be cut, for example. Therefore, where the distance across the cable varies beyond a certain amount is a piece of information that is highly useful in the production of continuous ribbon cable having no defects.

With block 18 positioned on support 16 to slide freely thereon, one can see that if the distance between the two outermost grooves varies, block 18 will move toward block 17 if the distance is shorter than it should be, and it will move away from block 17 if the distance is greater than what it should be. In either event, its movement will cause slidable rod 22 which is a part of the gauge 23 to move in or out of cylinder 24, and a given movement will cause the needle 25 to move either clockwise or counter-clockwise. In FIGURE 1 the gauge 23 is shown equipped with electrical limits set at +7 mils and at −7 mils. Thus, when needle 25 moves as far over as to +7 in the clockwise fashion or to −7 in the counter-clockwise fashion it will contact an electrical contact 26. The needle is tied in electrically with a power supply 27 and its contact with a pole 26 activates a signal 28. This signal preferably does two things. First, it rings a bell contained in the signal and secondly, it activates an ink marker 29. The ringing of the bell allows the operator to stop the running of the belt and the ink marking affords a ready location and examination of the faulty area.

The ink marker may be a plunger-type cylinder 29 containing a wad of absorbent material at its end that contains ink. Upon activation this ink-bearing member, shown by dotted lines 30, moves up against the underneath side of cable 10 and puts an ink mark on it, and when the width of the cable again becomes normal or within the set limits, the marker then immediately falls by gravity back into element 29.

As shown in FIGURE 3 the cable 10 used in this invention is a ribbon cable which contains a plurality of grooves 31 and a plurality of conductors 31a. These and the tongues may be of any size and shape. Preferably, one uses well-rounded tongues to prevent damage to the insulation in the cable. While a smaller number of tongues could be used, it is preferred to use four in the arrangement shown since that arrangement gives the greatest holding stability to the grooved cable.

When an imperfection is noted by the above procedure and operation of the apparatus, one may wish then to terminate the cable just before reaching that imperfection, and, of course, one may wish to cut out the imperfect section so that the remaining cable has a true beginning. To effect this and other operations there is provided by this invention a tool for terminating and otherwise working on the cable. This tool may be built into the gauge, which has just been described, by simply using the blocks 17 and 18 as supports for the working tools. Preferably, the working tool is positioned as a separate element in a downstream position on independent supports.

As shown in FIGURE 4 the working tool 32 of this invention comprises a support 33 which is positioned on a table or like surface 34 and which contains reciprocal arms 35 and 36 with aligned cutting elements 37 and 38 on their respective ends. The cable 10 is made to pass through cutter 32 in the direction shown by arrow 39. It is moved through the cutter to the desired position, and the operator merely brings the cutters together which act around cam follower 40 that controls the distance between the cutters when they are in their closest relationship. As will be seen below, these cutters may cut through the insulation only or they may cut also the conductor. The cam follower 40 is mounted on shaft 40a which may be manually operated by a hand crank, for example, or by an electrical motor neither of which is shown for convenience.

Figure 5:
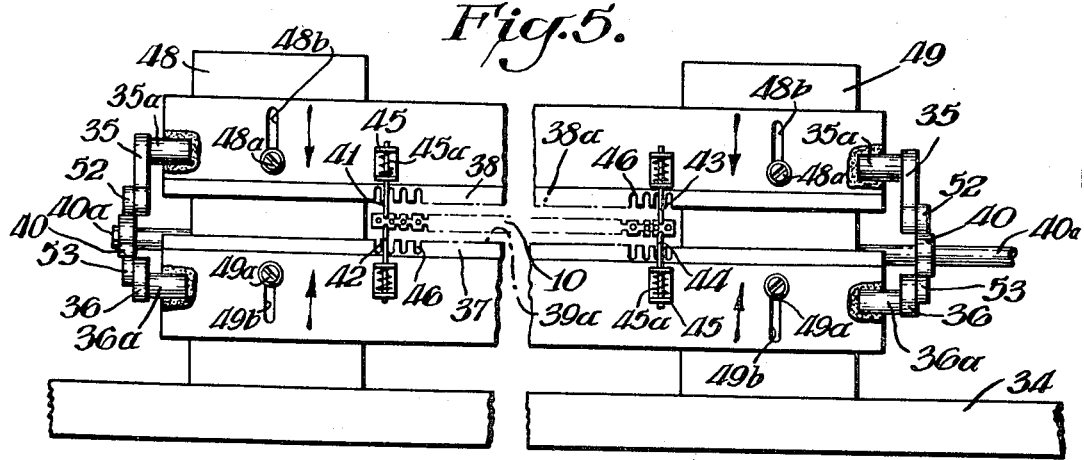
FIGURE 5 is a front view of the stripper shown in FIGURE 4.

As shown in FIGURE 5 the cable 10 is in position to be cut by cutters 37 and 38 having been guided to this position by the tongues 41, 42, 43 and 44. These tongues are mounted on the respective cutters by brackets 45 which are fixed to and extend forwardly from the given cutter. A tongue is retained in its bracket mountings and is activated by a spring 45a that is so loaded that the tongue rides in the groove when the cutter is out of cutting contact with cable 10. When cutter 38, shown in FIGURE 5, is pushed downwardly and cutter 37 is pushed upwardly, the respective bracket/spring mounting slides down on its respective tongue to allow the cutting edges 38a and 39a to meet. If desired, the tongues 41 and 42 may be mounted directly on block 48, and tongues 43 and 44 may be mounted directly on block 49, which tongues do not move when the cutters reciprocate, and by such a mounting one can eliminate the bracket/spring holders 45/45a. As is noted, also in FIGURE 5, the cutters 38 and 37 are slidably held to blocks 48 and 49 by the screw 48a and slot 48b and 49a/49b mountings, respectively. The two blocks 48 and 49 rest on or are mounted on support 34 and the shaft 40a spans the distance therebetween thus causing the cam follower 40 on each of the blocks to act in unison.

The arms 35 and 36 are fixed to the respective cutter by studs 35a and 36a which are contained in slots 35b and 36b in the respective arms so that the arms can in effect move away from the cutters as their respective cam follower elements 52 and 53 follow cam follower 40 making the cutters rise or fall. As shown in FIGURE 4 the arms 35 and 36 are held to the block by pins 35b and 36b about which they pivot, respectively.

Each of the cutters contains grooves 46 that are spaced in alignment above the respective conductors which are to be stripped. When cutters move to come together as much as possible the rounded section of a groove 46 will not cut the given conductor it is approaching because of the precise machinery of the groove, but it will cut the insulation contacting the conductor. Of course, if it is desired to cut a particular conductor, the upper and lower grooves may be eliminated.

Figure 6:
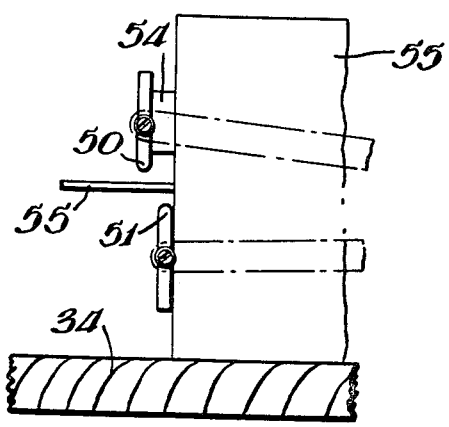
FIGURE 6 is a view similar to that in FIGURE 4 but illustrating a different tool.

In FIGURE 6 there is shown a means for bending wires. Instead of having cutters directly aligned, blunt plungers 50 and 51 are present in a relationship much the same as the cutters so that when the reciprocating arms are brought together the given conductor in the cable is bent for the movement of plunger 50 downwardly goes beyond the movement of the plunger 51 upwardly, thus bending the given conductor, shown as 55, acted upon. The plunger 50 is shown mounted on extension 54 which places it further from block 55. This extension can be of any desired distance, and, of course, plunger 51 can be the one that is mounted on an extension rather than bender element 50.

By the apparatus of this invention it is possible to produce interconnections required for computer and other electronic assemblies using ribbon cables. In such uses ribbon cables offer a compact, controlled transmission line. The apparatus of this invention makes it possible to carry out the stripping of the insulation and the trimming of the conductor automatically with surety that a precise result is obtained. This means, for example, that the exposed connector can be precisely soldered or otherwise treated and the desired interconnections can be made efficiently and accurately, thus maintaining the controlled electrical transmission afforded initially by the conductor cable that was precisely constructed.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

We claim:

1. A tool for working on a groove containing workpiece which tool comprises two jigs one located directly above the other and each having co-acting guiding elements adapted to be positioned in correlated grooves in the work piece when said work-piece is positioned between the jigs; and in slidable contact with each jig a reciprocating element adapted to work on certain parts of said work-piece, each reciprocating element acting in a plane substantially perpendicular to said positioned workpiece.

2. A tool in accordance with claim 1 in which said reciprocating element contains a pair of cutters.

3. A tool in accordance with claim 1 in which said reciprocating element contains a bending element.

4. A tool in accordance with claim 1 which includes a gauge.

5. Apparatus comprising two supports positioned apart from each other and adapted to have a continuous ribbon cable which has longitudinally running grooves in its outer surface pass between them; and supported by each support at least one guiding element which is adapted to be positioned in one of said grooves as said cable passes between said supports.

6. Apparatus in accordance with claim 5 in which one of said supports is stationary and the other is slidably movable away from and toward the stationary support.

7. Apparatus in accordance with claim 6 in which the said slidable support activates a gauge as it moves.

8. Apparatus in accordance with claim 5 in which both supports are stationary and vertically slidable thereon are a pair of cutting blades adapted to be moved simultaneously toward and away from each other by a common activator.

9. Apparatus in accordance with claim 8 which contains a blade having grooves in its cutting edge.

10. Apparatus in accordance with claim 8 in which each blade has grooves in its cutting edge aligned with corresponding grooves in the other blade and each blade has ridges between adjacent grooves which ridges afford cutting edges and which meet when said blades are moved toward each other.

11. Apparatus comprising two supports positioned apart from each other and adapted to have a continuous ribbon cable, which has longitudinally running grooves in its outer surface, pass between them; supported by each support at least one guiding element which is adapted to be positioned in one of said grooves as said cable passes between said supports; spanning the distance between said supports a reciprocating tool one end of which is movably supported by one of said supports and the other end of which is movably supported by the other support; and means for raising and lowering the said tool to contact uniformly a cable positioned between said supports.

12. Apparatus in accordance with claim 11 in which each end of said tool is mounted on an arm which is raised and lowered by a cam, the cams being driven by a common cam shaft.

13. Apparatus in accordance with claim 11 in which said reciprocating tool comprises a pair of cutter blades, one moving downwardly and the other moving upwardly to cut into a cable positioned between said supports.

14. Apparatus in accordance with claim 13 in which said blades contain at least one pair of aligned grooves that cut through only the insulation about a given cable conductor aligned with said pair of grooves.

15. Apparatus in accordance with claim 11 in which said reciprocating tool comprises a bender.

16. Apparatus in accordance with claim 15 in which said bender comprises at least one pair of plungers arranged one above the other in an off-set position, the one plunger being in support relationship with a given cable conductor aligned with said pair of plungers and the other plunger, which is movable past the end of said plunger supporting said conductor, being in bending relationship with said conductor.

References Cited

UNITED STATES PATENTS

| | | | |
|---|---|---|---|
| 2,352,697 | 7/1944 | Dittrich | 269—87.1 |
| 2,378,278 | 6/1945 | Bannister | 72—34 |
| 2,466,830 | 4/1949 | Tofflemire | 72—332 |
| 3,176,550 | 4/1965 | Marcotte | 81—9.51 |

CHARLES W. LANHAM, *Primary Examiner.*

RICHARD J. HERBST, *Examiner.*

L. A. LARSON, *Assistant Examiner.*